(12) United States Patent  
Seigler et al.

(10) Patent No.: US 8,289,650 B2
(45) Date of Patent: Oct. 16, 2012

(54) HAMR RECORDING HEAD HAVING A SLOPED WALL POLE

(75) Inventors: Michael Allen Seigler, Pittsburgh, PA (US); Sharat Batra, Wexford, PA (US); Robert Earl Rottmayer, Wexford, PA (US); Hua Zhou, Pittsburgh, PA (US); Thomas William Clinton, Pittsburgh, PA (US); Jie Gong, Pittsburgh, PA (US)

(73) Assignee: Seagate Technology LLC, Scotss Valley, CA (US)

( * ) Notice: Subject to any disclaimer, the term of this patent is extended or adjusted under 35 U.S.C. 154(b) by 1046 days.

(21) Appl. No.: 11/857,498

(22) Filed: Sep. 19, 2007

(65) Prior Publication Data

US 2009/0073858 A1   Mar. 19, 2009

(51) Int. Cl.
G11B 5/127   (2006.01)

(52) U.S. Cl. .................................................. 360/125.3

(58) Field of Classification Search ............. 360/125.03, 360/125.09, 125.04, 125.17, 125.12, 125.16, 360/125.06, 125.15, 125.26, 125.71, 125.02, 360/125.13, 125.21, 125.24, 125.27
See application file for complete search history.

(56) References Cited

U.S. PATENT DOCUMENTS

| | | | | |
|---|---|---|---|---|
| 5,333,086 | A * | 7/1994 | Frey et al. | 360/125.41 |
| 5,831,792 | A * | 11/1998 | Ananth | 360/236.6 |
| 6,721,131 | B2 | 4/2004 | Litvinov et al. | |
| 6,721,138 | B1 * | 4/2004 | Chen et al. | 360/317 |
| 6,771,464 | B2 | 8/2004 | Minor | |
| 6,822,829 | B2 | 11/2004 | Minor et al. | |
| 6,982,932 | B2 * | 1/2006 | Sakakima et al. | 369/13.17 |
| 7,791,839 | B2 * | 9/2010 | Olson et al. | 360/125.31 |
| 8,059,374 | B2 * | 11/2011 | Zhao et al. | 360/324.2 |
| 8,119,265 | B2 * | 2/2012 | Hsia et al. | 428/832 |
| 2003/0235121 | A1 | 12/2003 | Eppler | |
| 2004/0001420 | A1 | 1/2004 | Challener | |
| 2004/0008591 | A1 | 1/2004 | Johns et al. | |
| 2004/0062503 | A1 | 4/2004 | Challener | |
| 2005/0052771 | A1 | 3/2005 | Rausch et al. | |
| 2005/0078565 | A1 | 4/2005 | Peng et al. | |
| 2005/0111309 | A1 | 5/2005 | Peng | |
| 2005/0122850 | A1 | 6/2005 | Challener et al. | |
| 2005/0135008 | A1 | 6/2005 | Challener et al. | |
| 2005/0190682 | A1 | 9/2005 | Gage et al. | |
| 2005/0289576 | A1 | 12/2005 | Challener | |
| 2006/0119983 | A1 | 6/2006 | Rausch et al. | |
| 2006/0143635 | A1 * | 6/2006 | Liu et al. | 720/659 |
| 2006/0187564 | A1 * | 8/2006 | Sato et al. | 360/59 |
| 2006/0222904 | A1 * | 10/2006 | Hsia et al. | 428/832 |
| 2007/0139818 | A1 * | 6/2007 | Shimazawa et al. | 360/126 |
| 2007/0165495 | A1 * | 7/2007 | Lee et al. | 369/13.33 |
| 2007/0242396 | A1 * | 10/2007 | Shimazawa et al. | 360/324.12 |
| 2008/0170319 | A1 | 7/2008 | Seigler et al. | |
| 2008/0278864 | A1 * | 11/2008 | Zhang et al. | 360/324.12 |
| 2010/0177449 | A1 * | 7/2010 | Zhao et al. | 360/324.12 |
| 2012/0009337 | A1 * | 1/2012 | Zhang et al. | 427/131 |
| 2012/0045662 | A1 * | 2/2012 | Zou et al. | 428/810 |
| 2012/0113541 | A1 * | 5/2012 | Hsia et al. | 360/59 |

* cited by examiner

*Primary Examiner* — Allen Cao

(74) *Attorney, Agent, or Firm* — Hall Estill Attorneys at Law

(57) ABSTRACT

An apparatus includes a waveguide having an end adjacent to an air bearing surface, first and second poles positioned on opposite sides of the waveguide, and wherein the first pole includes a first portion spaced from the waveguide and a second portion extending from the first portion to the air bearing surface, with the second portion being structured such that an end of the second portion is closer to the waveguide than the first portion.

19 Claims, 9 Drawing Sheets

HAMR RECORDING HEAD HAVING A SLOPED WALL POLE

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

This invention relates to magnetic recording heads, and more particularly to such recording heads for use in heat assisted magnetic recording devices.

BACKGROUND OF THE INVENTION

In thermally assisted magnetic recording, information bits are recorded on a data storage medium at elevated temperatures, and the heated area in the storage medium determines the data bit dimension. In one approach, a beam of light is condensed to a small optical spot onto the storage medium to heat a portion of the medium and reduce the magnetic coercivity of the heated portion. Data is then written to the reduced coercivity region.

Heat assisted magnetic recording (HAMR) has been developed to address instabilities that result from a reduction in grain size in magnetic recording media. HAMR generally refers to the concept of locally heating a storage medium to reduce the coercivity of the storage medium so that an applied magnetic writing field can more easily direct the magnetization of the storage medium during the temporary magnetic softening of the storage medium caused by the heat source. Heat assisted magnetic recording allows for the use of small grain media, which is desirable for recording at increased areal densities, with a larger magnetic anisotropy at room temperature to assure sufficient thermal stability.

One example of a recording head for use in heat assisted magnetic recording generally includes a write pole and a return pole magnetically coupled to each other through a yoke or pedestal, and a waveguide for focusing light onto the storage medium. One of the most challenging design requirements for an integrated HAMR head is in positioning the magnetic poles with respect to the focused spot in the waveguide. Magnetic materials such as alloys of Fe, Co and Ni are poor optical materials, so they cannot be positioned in close proximity with the waveguide for an appreciable distance.

There is a need for a magnetic pole design that reduces the probability of adjacent track writing and data destabilization.

SUMMARY OF THE INVENTION

In one aspect, this invention provides an apparatus including a waveguide having an end adjacent to an air bearing surface, and first and second poles positioned on opposite sides of the waveguide, wherein the first pole includes a first portion spaced from the waveguide and a second portion extending from the first portion to the air bearing surface, with the second portion being structured such that an end of the second portion is closer to the waveguide than the first portion.

The magnetic saturation of the second portion of the first pole can vary in a down track direction, either discretely using layers having different magnetic saturation, or continuously. The second portion of the first pole can have various cross-sectional shapes, and can include a plurality of sections.

The second pole can include a protrusion extending toward the second portion of the first pole at the air bearing surface. A near field transducer can be positioned in a core layer of the waveguide.

DETAILED DESCRIPTION OF THE INVENTION

Figure 1:
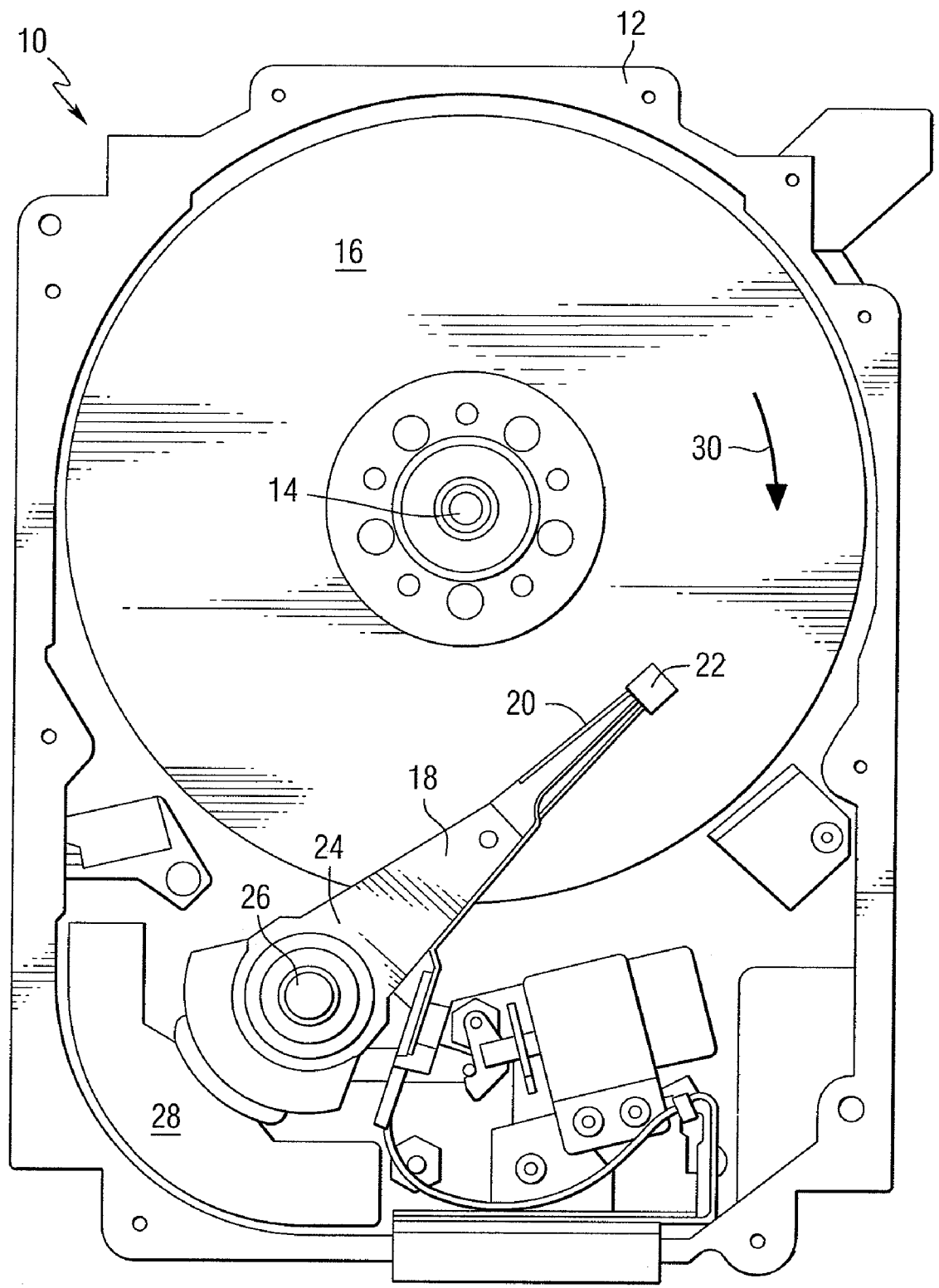
FIG. 1 is a pictorial representation of a data storage device in the form of a disc drive.

This invention encompasses various devices used for heat assisted magnetic recording. FIG. 1 is a pictorial representation of a data storage device in the form of a disc drive 10 including a recording head constructed in accordance with an aspect of this invention. The storage device includes a housing 12 (with the upper portion removed and the lower portion visible in this view) sized and configured to contain the various components of the disc drive. The disc drive includes a spindle motor 14 for rotating at least one data storage medium 16 within the housing, in this case a magnetic disc. At least one arm 18 is contained within the housing 12, with each arm 18 having a first end 20 with a recording and/or reading head or slider 22, and a second end 24 pivotally mounted on a shaft by a bearing 26. An actuator motor 28 is located at the arm's second end 24, for pivoting the arm 18 about a pivot point to position the head 22 over a desired sector of the disc 16. The actuator motor 28 is controlled by a controller that is not shown in this view and is well-known in the art. The storage medium rotates in the direction indicated by arrow 30. As the disc rotates, the slider flies over the disc surface on an air bearing.

For heat assisted magnetic recording (HAMR), an electromagnetic wave of, for example, visible, infrared or ultraviolet light is directed onto a surface of a data storage medium to raise the temperature of a localized area of the medium to facilitate switching of the magnetization of the area. Recent designs of HAMR recording heads include a thin film waveguide on a slider to guide light to the storage medium for localized heating of the storage medium. To launch light into the waveguide, a grating coupler can be used.

Figure 2:
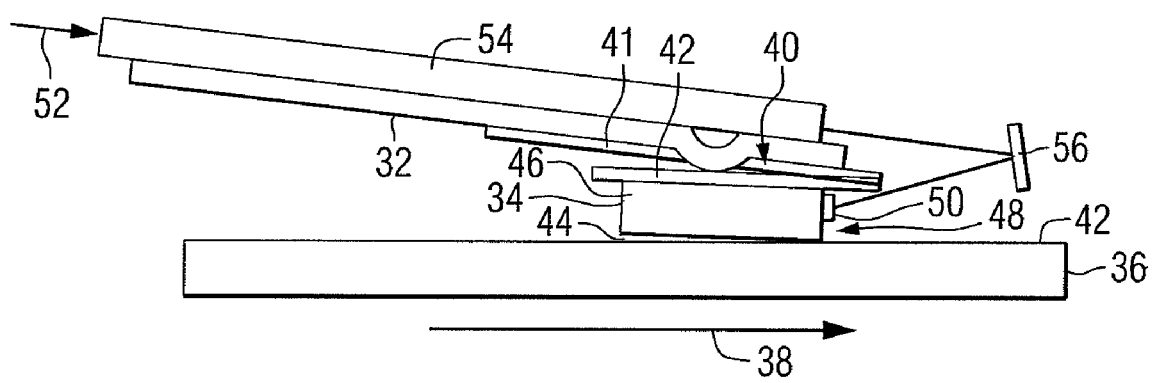
FIG. 2 is a schematic representation of a slider and a storage medium.

FIG. 2 is a schematic representation of a portion of a suspension arm 32 and slider 34, in combination with a magnetic recording disc 36. During writing and/or reading of data, the disc moves relative to the slider in a direction indicated by arrow 38. The slider is coupled to the suspension arm by a gimbal assembly 40 positioned adjacent to a surface 42 of the disc and separated from the surface of the disc by an air bearing 44. The gimbal assembly includes a first portion 41 connected to the suspension arm 32 and a second portion 42 connected to the slider 34. The second portion is cantilevered to the first portion. The slider has a leading, or front, end 46 and a trailing, or back end 48. The leading end faces toward the pivot point of the suspension arm and the trailing end faces away from the pivot point of the suspension arm. The slider includes an optical transducer 50 mounted adjacent to the trailing end. A laser produces a beam of light illustrated by arrow 52 that is transmitted toward the slider by an optical fiber 54. A mirror 56 is mounted at the end of the suspension arm to reflect the light toward the optical transducer. The fiber is attached to the suspension arm and terminates before the end of the suspension. The prism or mirror directs the output from the fiber onto the transducer on the slider. Additional lenses may be necessary to maintain a small beam diameter.

Figure 3:
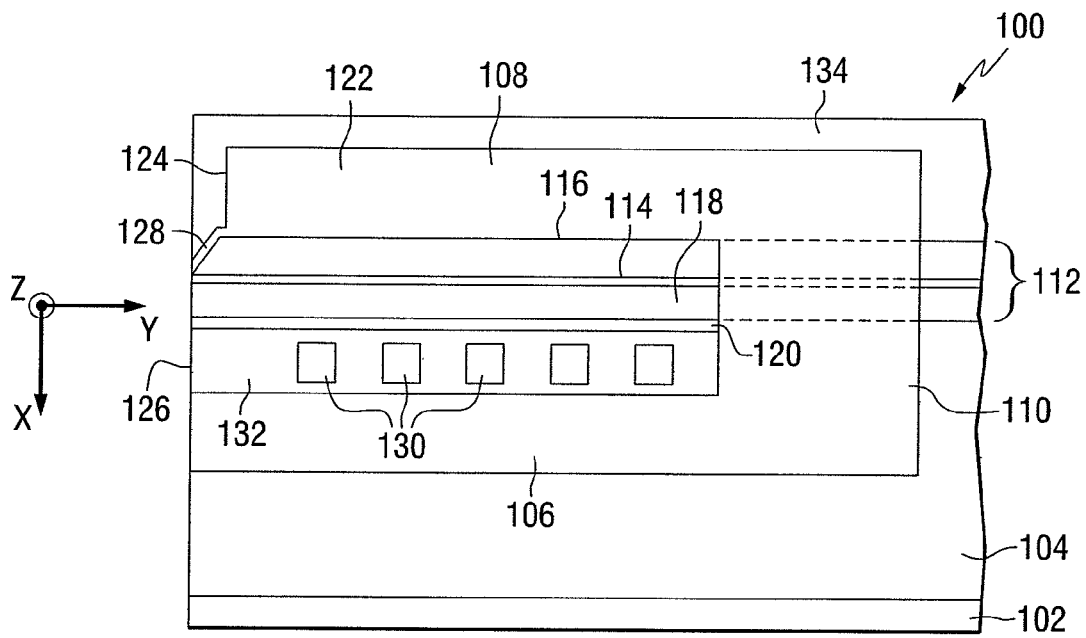
FIG. 3 is a cross-sectional view of a recording head constructed in accordance with an embodiment of the invention.

FIG. 3 is a cross-sectional view of a recording head 100 constructed in accordance with a first aspect of the invention. The recording head includes a substrate 102, a base coat 104 on the substrate, a bottom pole 106 on the base coat, and a top pole 108 that is magnetically coupled to the bottom pole through a yoke or pedestal 110. A waveguide 112 is positioned between the top and bottom poles. The waveguide includes a core layer 114 and cladding layers 116 and 118 on opposite sides of the core layer. A mirror 120 is positioned adjacent to one of the cladding layers. The top pole is a two-piece pole that includes a first portion, or pole body 122, having a first end 124 that is spaced from the air bearing surface 126, and a second portion, or sloped pole piece 128, extending from the first portion and tilted in a direction toward the bottom pole. The second portion is structured to include an end adjacent to the air bearing surface 126 of the recording head, with the end being closer to the waveguide than the first portion of the top pole. A planar coil 130 also extends between the top and bottom poles and around the pedestal. While this example includes a planar coil, other types of coils, such as a helical coil, could be used. A helical coil would wrap around the bottom/return pole. In alternative embodiments, the planar coil could be positioned between the waveguide and the top pole.

An insulating material 132 separates the coil turns. Another layer of insulating material 134 is positioned adjacent to the top pole. In one example, the substrate can be AlTiC, the core layer can be $Ta_2O_5$, and the cladding layers (and other insulating layers) can be $Al_2O_3$.

Figures 4, 5:
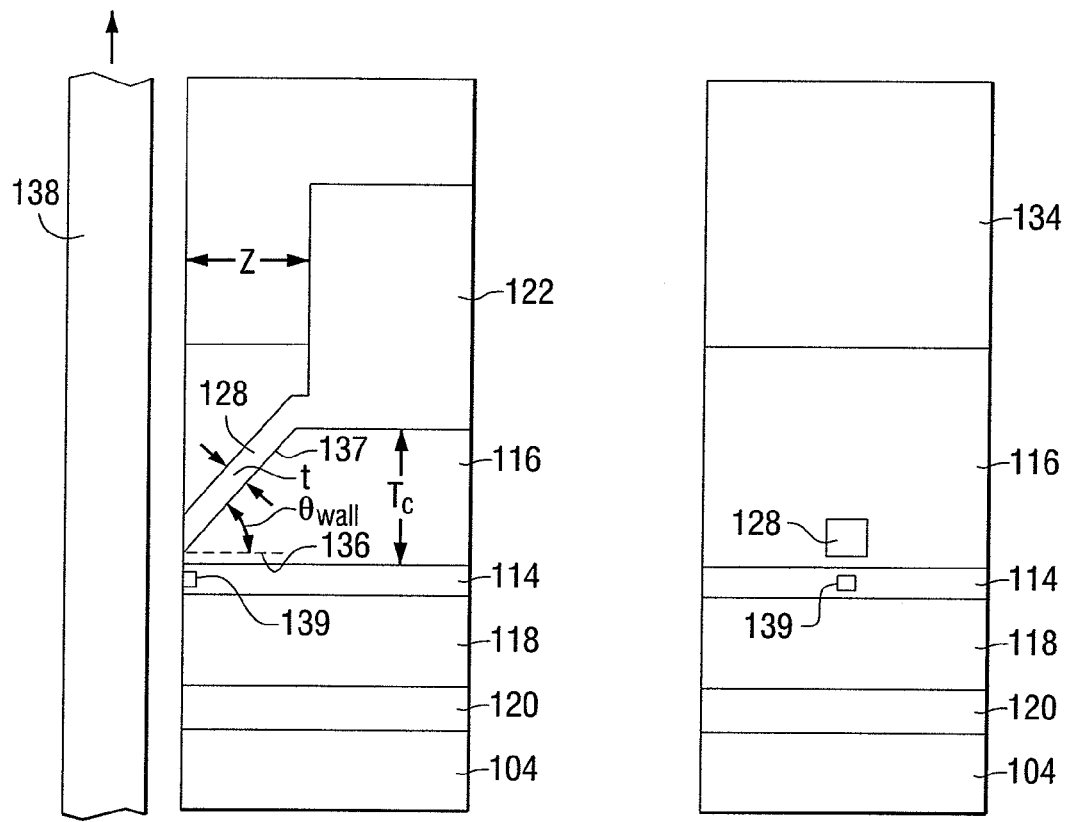
FIG. 4 is an enlarged view of a portion of the recording head of FIG. 3.
FIG. 5 is a plan view of the air bearing surface of the recording head of FIG. 3.

FIG. 4 is an enlarged cross-sectional view of a portion of the recording head of FIG. 3. FIG. 5 is a plan view of a portion of the air bearing surface of the recording head of FIG. 3. When mounted in a data storage device, the recording head is positioned adjacent to a storage medium 138, that moves with respect to the recording head as shown by the arrow in FIG. 4. A near field transducer 139 can be positioned adjacent to the air bearing surface to further concentrate light as it exits the waveguide. In general, the near field transducer (NFT) would be located adjacent to the ABS and near the top pole. The NFT can be positioned in the waveguide core, or the cladding, or between the waveguide core and the cladding. The core-to-NFT spacing and/or the NFT-to-pole spacing can be selected to achieve the desired performance of the NFT. Some types of NFTs may not fit between the pole and the waveguide, but could be located on the surface of the ABS. The NFT can be, for example, a plasmon resonator or an aperture. Plasmon resonators include, for example, ridge waveguides, bow ties, pins, pins with disks, etc. In one example, the distance $T_c$ between the first portion 122 of the pole 108 and the core layer 114 of the waveguide 112 is at least 500 nm, and can be about 1 μm. In another example, the distance $T_c$ can be increased to allow for positioning of the coil between the waveguide and the top pole.

The structure of FIGS. 3, 4 and 5 tapers the second portion or sloped pole piece 128 of the top pole away from the waveguide core. As used in this description, a sloped pole piece is a pole piece that has a first end adjacent to the air bearing surface, and a second end magnetically coupled to the body of the pole, wherein the first end is closer to the core layer than the second end. In the example of FIGS. 3, 4 and 5, the sloped pole piece includes a single layer. The wall 137 of the sloped pole piece 128 forms an angle $\theta_{wall}$ with a plane 136 that is parallel to the core layer of the waveguide.

Figure 6:
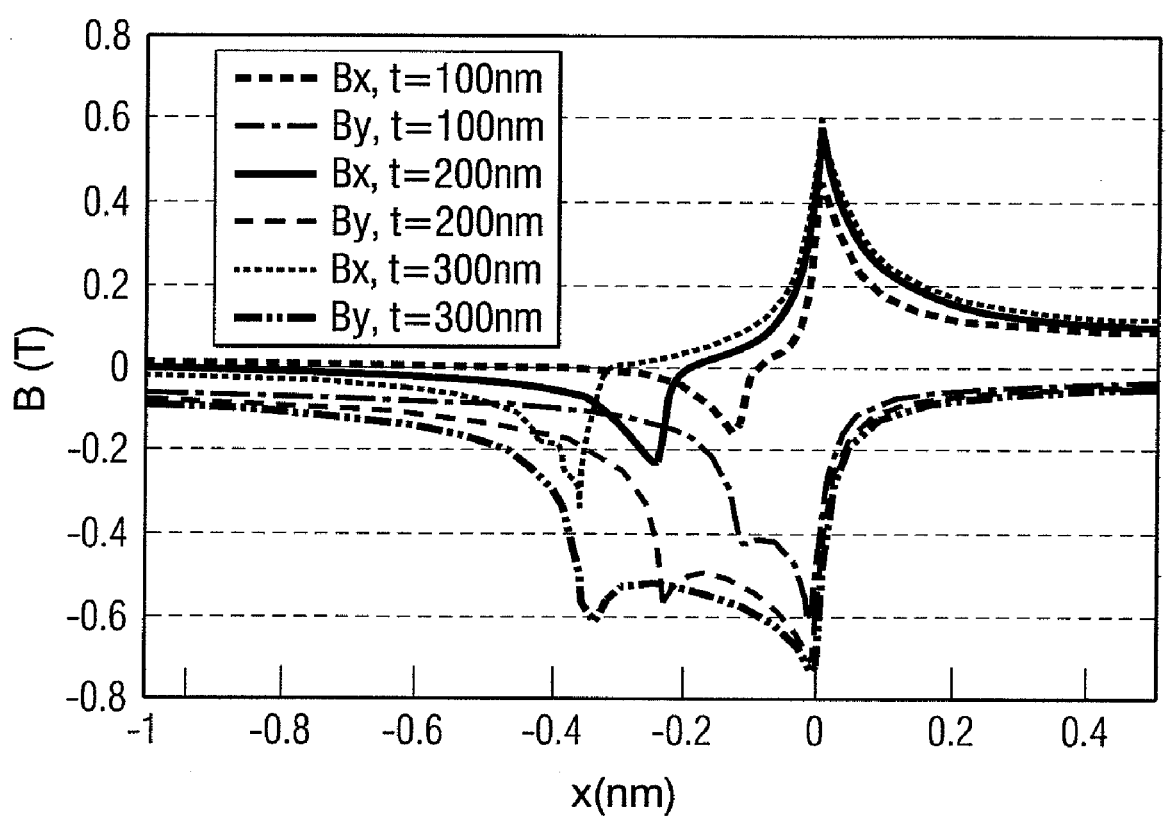
FIG. 6 is a graph of magnetic field versus distance for various pole thicknesses.

Finite Element Modeling was used to predict the field from the head of FIGS. 3, 4 and 5. FIG. 6 shows the calculated resulting field. The X-axis is the down track dimension, where X=0 is the leading edge of the pole. In a direction perpendicular to the ABS (i.e., along the Y-axis), the field value is calculated in a direction along the center of the pole, and at a point 10 nm below the ABS. The following inputs were used in generating the graphs of FIG. 6: $M_s$=1.9 T, distance from ABS=10 nm, NI=300 mA-Turns, μ of pole piece 106=500, μ of pole piece 128=100, $\theta_{wall}$=30°.

FIGS. 7, 8, 9 and 10 show a series of designs that were modeled in an attempt to lower the field spike at the rear of the pole, increase the field at the front face of the pole, or in general increase the ratio of the front face field to the back end field spike.

Figure 7:
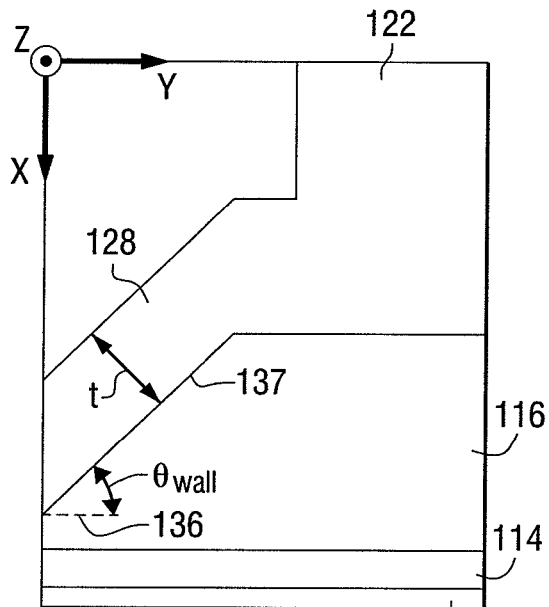
FIG. 7 is an enlarged cross-sectional view of a portion of the recording head of FIG. 4.
Figure 8:
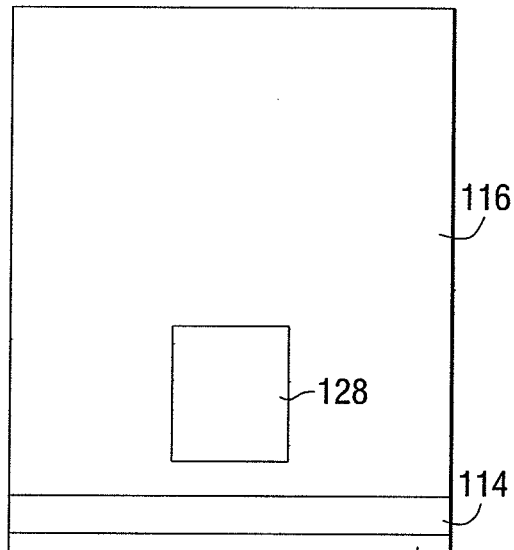
FIG. 8 is a plan view of the air bearing surface of the recording head of FIG. 7.

FIGS. 7 and 8 show a sloped pole piece 128. For this design, the wall angle ($\theta_{wall}$), (that is, the angle between the wall of the sloped pole piece that is closest to the core layer and a plane parallel to the core layer) can have a value between ~15° and ~75°. A smaller angle is better for the magnetics, but a larger angle is better for the optics. The thickness of the poles and the pole material can be varied in the design.

Figure 9:
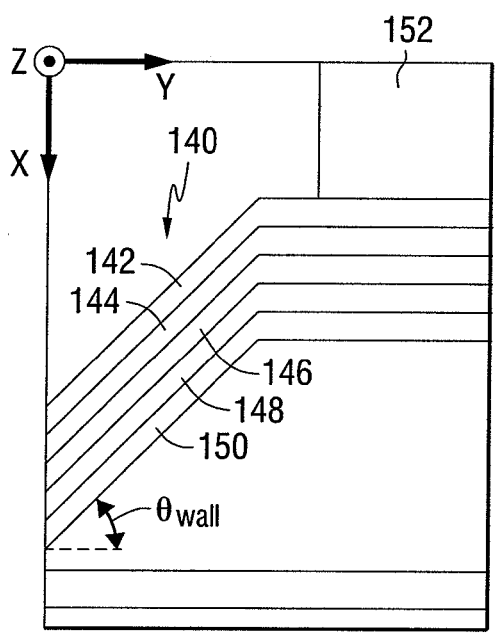
FIG. 9 is a cross-sectional view of a portion of a recording head that includes a graded pole piece.
Figure 10:
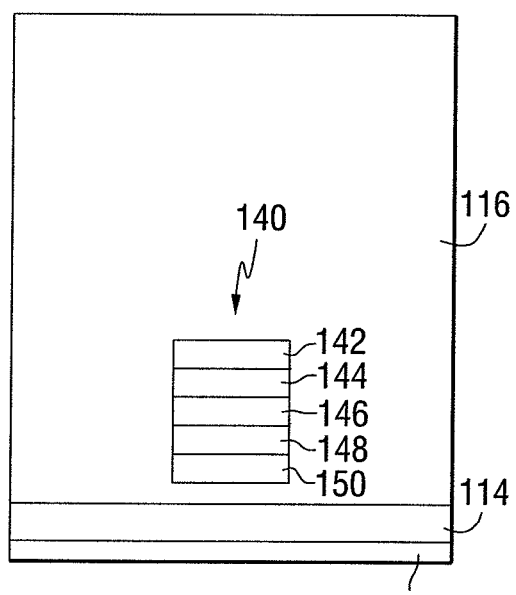
FIG. 10 is a plan view of a portion of the air bearing surface of the recording head of FIG. 9.

FIG. 9 is a cross-sectional view of a recording head that includes a graded pole piece 140. The graded pole piece includes a plurality of layers 142, 144, 146, 148 and 150, each having a different magnetic saturation, $M_s$. FIG. 10 is a plan view of a portion of the air bearing surface of the recording head of FIG. 9. FIGS. 9 and 10 show a graded $M_s$ sloped pole piece design where the $M_s$ of layer 150, near the waveguide core, has a large value (for example, 1.8 to 2.4 Tesla) and the magnetic saturation of the other layers decreases in the –X direction, using the coordinate system shown in FIG. 3. While the example of FIGS. 9 and 10 shows distinct layers of magnetic material having different magnetic saturation, the $M_s$ of the sloped pole piece can be decreased continuously. In other examples, the entire top pole can be layered or can have a continuously varying magnetic saturation.

In one example of the graded sloped pole piece, a first layer of the pole piece that is close to the waveguide core layer can be 100 nm of 1.9 T CoNiFe. A second layer that is adjacent to the first layer can be 100 nm of 1.0 T NiFe. A third layer that is adjacent to the second layer can be 50 nm of 0.5 T NiCu. A fourth layer that is adjacent to the third layer can be 50 nm of 0.3 T NiCu. A fifth layer that is adjacent to the fourth layer can be 50 nm of 0.1 T NiCu.

In another example, the first layer can be 50 nm of 2.4 T FeCo plus 50 nm of CoNiFe. Then the second through fifth layers would be as described above.

Figure 11:
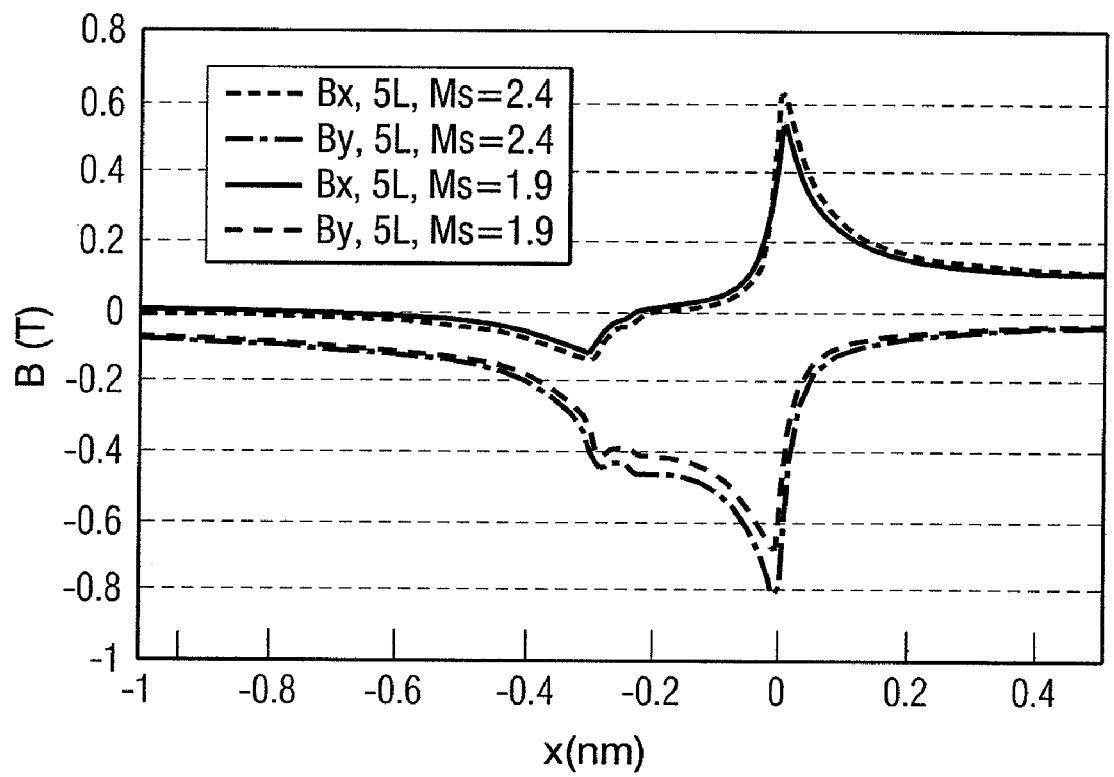
FIGS. 11 and 12 are graphs of finite element modeling (FEM) results showing the magnetic field from a graded sloped pole.
Figure 12:
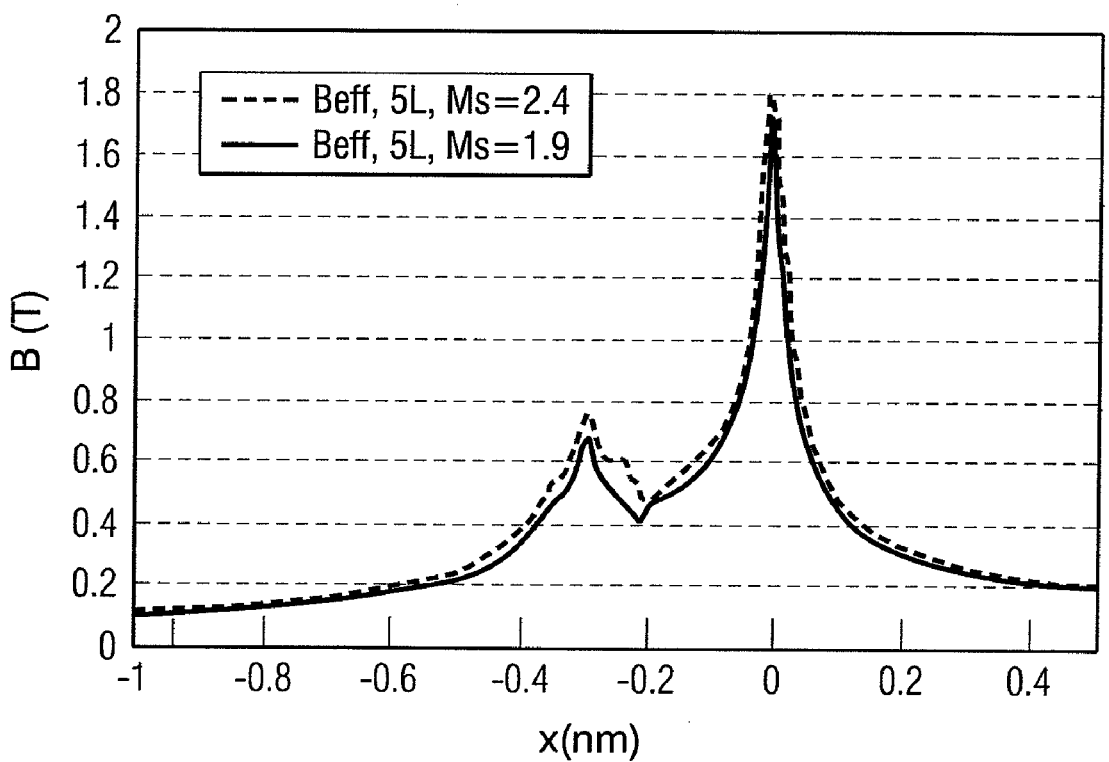

FIGS. 11 and 12 are finite element modeling (FEM) results showing the magnetic field from the sloped pole. FIG. 11 shows the field in the X and Y-directions: $B_x$ and $B_y$, using the coordinate system of FIG. 3. FIG. 12 shows the effective field $B_{eff}$.

In one example, the five layer graded $M_s$ sloped pole design includes layers having a $M_s$ of: 0.1, 0.55, 1, 1.45 and 1.9 T for the curves labeled $M_s$=1.9 T; and 0.1, 0.55, 1, 1.9 and 2.4 T for the curves labeled $M_s$=2.4 T in FIGS. 11 and 12. The values of 1.9 T and 2.4 T are for the magnetization of the layers closest to the waveguide core. It can be seen that the absolute and relative size of the field spike has been reduced significantly.

Figure 13:
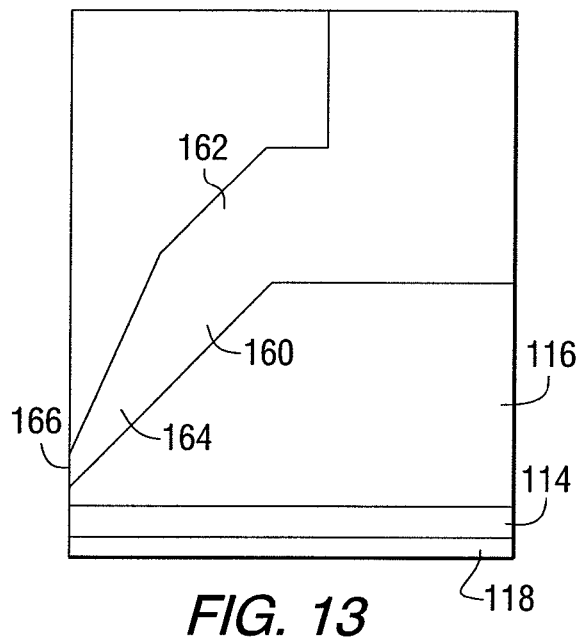
FIG. 13 is a cross-sectional view of a recording head that includes a tapered sloped pole piece.
Figure 14:
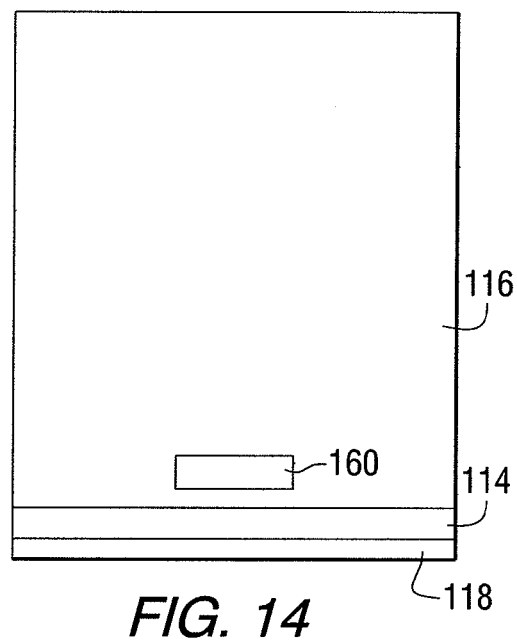
FIG. 14 is a plan view of a portion of the air bearing surface of the recording head of FIG. 13.

The shape of the sloped pole piece as it extends from the pole body to the ABS can be varied. FIG. 13 is a cross-sectional view of a recording head that includes a sharpened pole piece. FIG. 14 is a plan view of a portion of an air bearing surface of the recording head of FIG. 13. In this example, the sloped pole piece 160 includes a first portion 162 having a uniform cross-sectional shape, and a second portion 164 that is tapered as it extends to the air bearing surface 166. The sharpening reduces the amount of pole material at the ABS.

Figure 15:
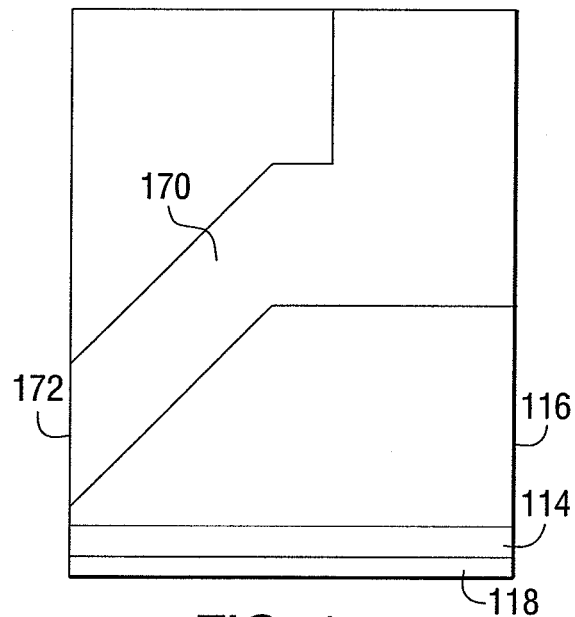
FIG. 15 is a cross-sectional view of a recording head that includes a tapered sloped pole piece.
Figure 16:
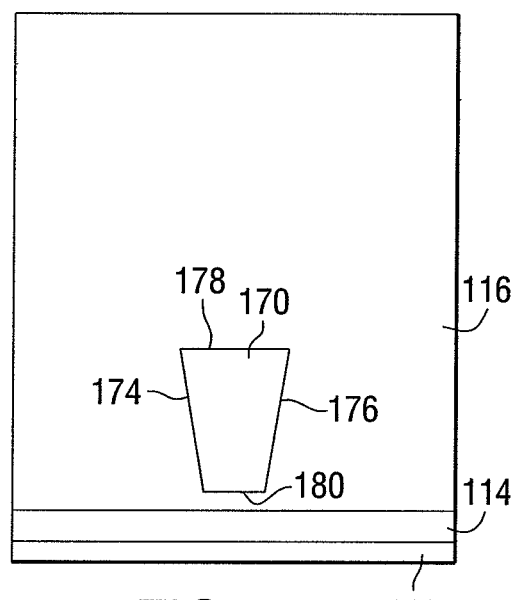
FIG. 16 is a plan view of a portion of the air bearing surface of the recording head of FIG. 15.

FIG. 15 is a cross-sectional view of another recording head that includes a sloped pole piece. FIG. 16 is a plan view of a portion of an air bearing surface of the recording head of FIG. 15. In this example, the sloped pole piece 170 includes a uniform trapezoidal cross-sectional shape as it extends to the air bearing surface 172. The sides 174 and 176 of the sloped pole piece are tapered such that the width of the trailing edge 178 of the sloped pole piece at the air bearing surface is larger than the width of the leading edge 180.

Figure 17:
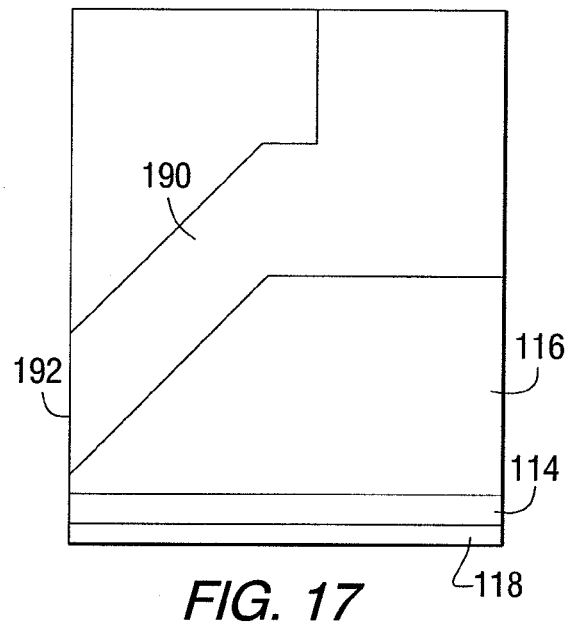
FIG. 17 is a cross-sectional view of a recording head that includes a tapered sloped pole piece.
Figure 18:
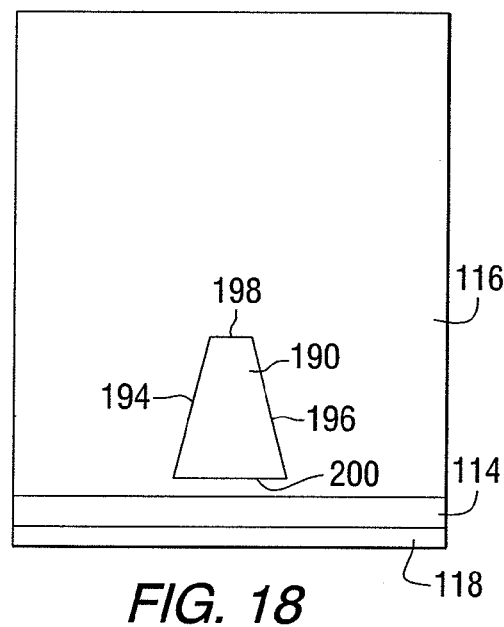
FIG. 18 is a plan view of a portion of the air bearing surface of the recording head of FIG. 17.

FIG. 17 is a cross-sectional view of a recording head that includes a sloped pole piece. FIG. 18 is a plan view of a portion of the air bearing surface of the recording head of FIG. 17. In this example, the sloped pole piece 190 includes a uniform trapezoidal cross-sectional shape as it extends to the air bearing surface 192. The sides 194 and 196 of the sloped pole piece are tapered such that the width of the leading edge 200 of the sloped pole piece at the air bearing surface is larger than the width of the trailing edge 198.

FIGS. 15 and 16 show a trapezoidal sloped pole piece, and FIGS. 17 and 18 show a reverse trapezoidal sloped pole piece. In these two cases, the shape of the pole is physically changed from the rectangular pole.

Figure 19:
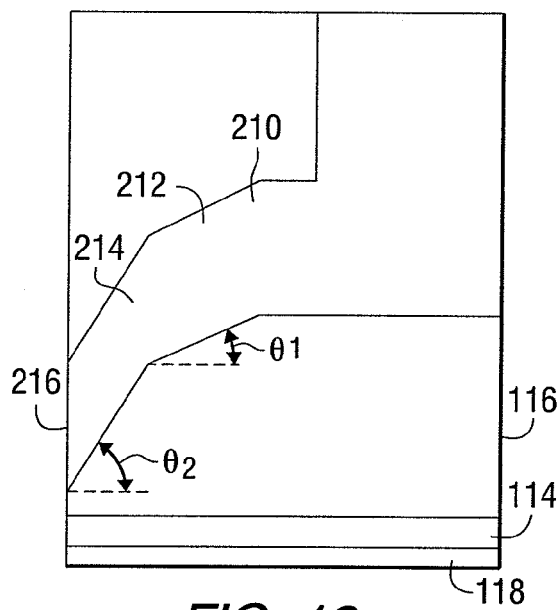
FIG. 19 is a cross-sectional view of a recording head that includes another sloped pole piece.
Figure 20:
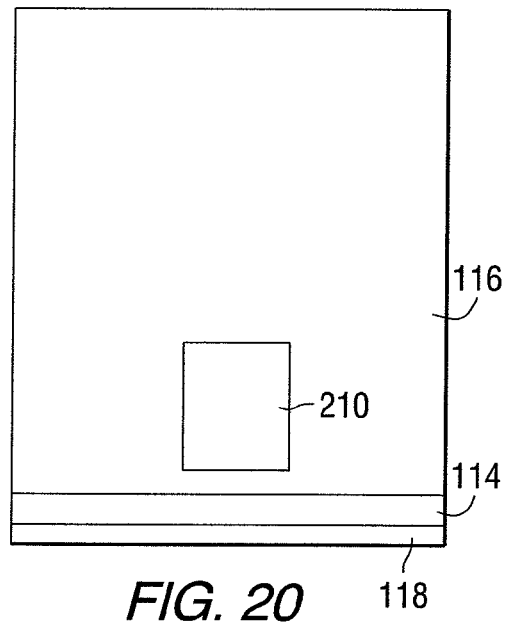
FIG. 20 is a plan view of a portion of the air bearing surface of the recording head of FIG. 19.

FIG. 19 is a cross-sectional view of another recording head that includes a sloped pole piece. FIG. 20 is a plan view of a portion of the air bearing surface of the recording head of FIG. 19. In this example, the sloped pole piece 210 includes a uniform rectangular cross-sectional shape as it extends to the air bearing surface 216. However, the sloped pole piece includes a first portion 212 that is positioned at a first angle $\theta_1$ with respect to the core layer and a second portion 214 that is positioned at a second angle $\theta_2$ with respect to the core layer. FIGS. 19 and 20 show a double slope pole piece. In the example of FIGS. 19 and 20, the distance between the pole and the waveguide core increases quickly with distance from the air bearing surface for good optical efficiency, and then changes to a more gradual slope to help increase the magnetic performance.

Figure 21:
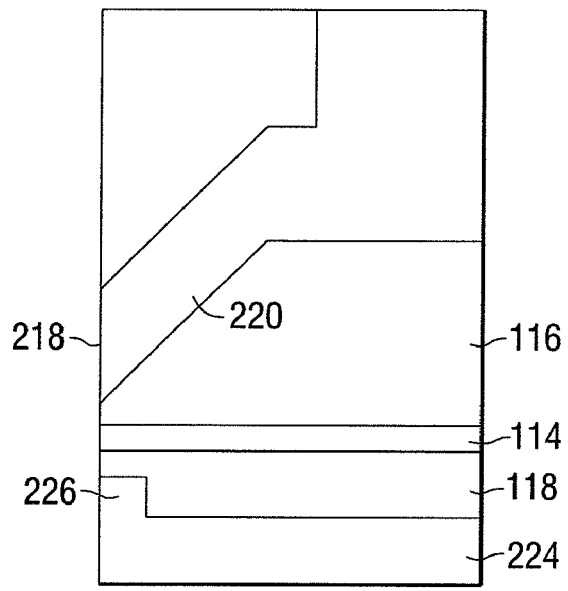
FIG. 21 is a cross-sectional view of another recording head that includes a sloped pole piece.
Figure 22:
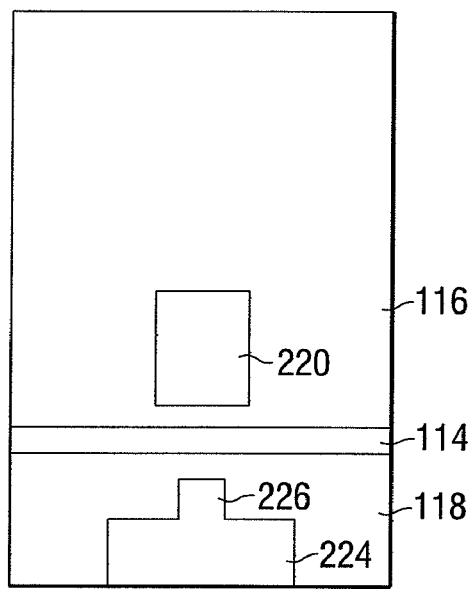
FIG. 22 is a plan view of a portion of the air bearing surface of the recording head of FIG. 21.

FIG. 21 is a cross-sectional view of a recording head that includes a sloped pole piece. FIG. 22 is a plan view of a portion of an air bearing surface of the recording head of FIG. 21. In this example, the sloped pole piece 220 has a uniform rectangular cross-sectional shape as it extends to the air bearing surface 218. However, the bottom pole 224 includes a projection 226 at the air bearing surface 218 that extends toward the sloped pole piece. FIGS. 21 and 22 show a design that brings the bottom pole up close to the sloped pole piece. This can help to reduce the flux divergence from the sloped pole piece before reaching the front edge of the core as it extends to the return pole.

Figure 23:
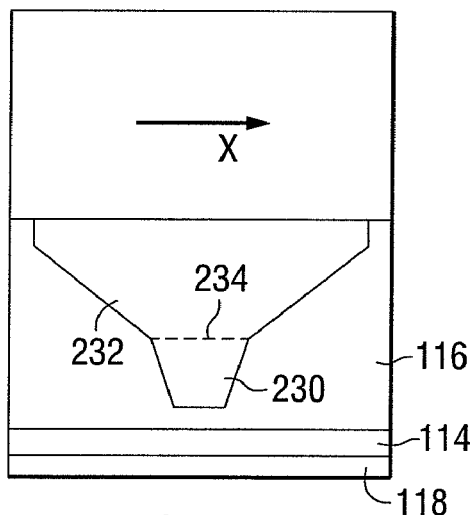
FIG. 23 is a top view of a recording head that includes a tapered sloped pole piece.
Figure 24:
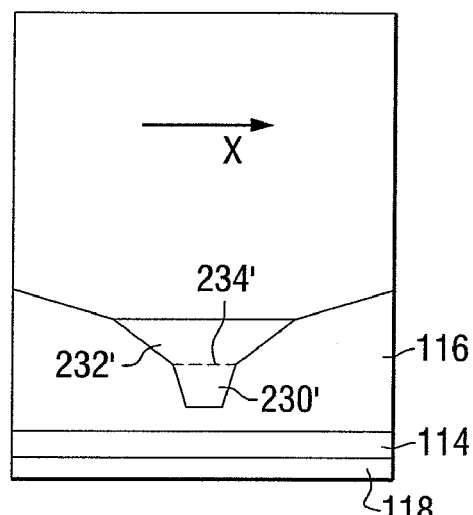
FIG. 24 is a top view of another recording head that includes a tapered sloped pole piece.

FIG. 23 shows a top down view of a recording head showing both the sloped pole piece 230 and the pole body 232 tapered in the X-direction. FIG. 24 shows a top down view of a recording head looking toward the ABS and showing both the sloped pole piece 230' and the pole body 232' tapered in the X-direction. This helps to focus the flux as it approaches the front edge of the sloped pole piece. There are options with respect to where the break point 234 or 234' is located. It can be on the slope, at the very top of the slope, or on the surface. There can also be more than one break point. In addition, the pole body can end at different distances from the ABS. This can be measured with respect to the sloped portion (i.e., the body extends to the slope or down onto the slope), or it can be measured with respect to the break points (i.e., it extends to the first break point).

It should be apparent that various aspects of the above designs could be combined with one another. For example, the trapezoidal pole can be constructed as a graded $M_s$ pole piece.

To prevent corrosion of the seed layer, the high moment (corrosive) seed layer can be capped with a very thin NiFe layer. This NiFe layer needs to be kept very thin if the material being plated on top of the seed layer has a moment >>1.0 Tesla. If the NiFe layer is too thick, the flux will escape from the pole at this point and cause a spike in the field under the pole. If the material being plated on top of the high moment seed layer is ~1.0 Tesla, the NiFe layer can be thicker. If the moment of the material being plated is <<1.0 Tesla, a different, more corrosion resistant material may be chosen as the capping layer, such as a Ni rich NiFe, CoNi or CoNiFe alloy. In one example, layer 150 may be a seed layer and a capping layer could be between layers 150 and 148. In another example, layers 150 and 148 could be seed layers and the capping layer could be between 148 and 146.

Some examples of material sets that can be used to construct the sloped pole piece are alloys including a first material "A" and a second material "B", where A=Cu, Au, Ag or a combination of these three; and B=Fe, Co, Ni or a combination of these three. The alloy would be a mix of A and B materials. There could be multiple components of either A or B. The difference between the A and B materials is that the A materials are more noble than the B materials, which allows for the adjusting of the composition. The moment ($4\pi M_s$) can be changed by changing the content of A. Increasing the A content can decrease moment.

While the invention has been described in terms of several examples, it will be apparent to those skilled in the art that various changes can be made to the described examples without departing from the scope of the invention as set forth in the following claims.

What is claimed is:

1. A recording head comprising:
   a waveguide having an end adjacent to an air bearing surface; and
   a write pole and a return pole positioned on opposite sides of the waveguide;
   wherein the write pole includes a first portion spaced from the waveguide and a second portion extending from the first portion to the air bearing surface, with the second portion being structured such that an end of the second portion is closer to the waveguide than the first portion, and wherein the second portion comprises an alloy including at least one of Cu, Au or Ag and at least one of Fe, Co or Ni.

2. The recording head of claim 1, wherein the second portion has a uniform cross-sectional shape.

3. The recording head of claim 2, wherein the shape is rectangular.

4. The recording head of claim 1, wherein the second portion is positioned at an angle with respect to a core layer in the waveguide in the range of about 15° to about 70°.

5. The recording head of claim 1, wherein the first portion is separated from a core layer in the waveguide by at least 500 nm.

6. The recording head of claim 1, further comprising:
   a coil having conductors positioned adjacent to the waveguide and on an opposite side of the waveguide from the write pole.

7. The recording head of claim 1, further comprising:
   a near field transducer.

8. The recording head of claim 1, further comprising:
   a mirror positioned adjacent to the waveguide.

9. The recording head of claim 8, wherein the mirror is positioned adjacent to a side of the waveguide opposite the write pole.

10. The recording head of claim 1, wherein the thickness of the second portion is smaller than the thickness of the first portion.

11. An recording head comprising:
    a planar waveguide including a core layer and first and second cladding layers on opposite sides of the core layer, and having an end adjacent to an air bearing surface; and
    a write pole and a return pole positioned on opposite sides of the waveguide;
    wherein the write pole includes a first portion spaced from the waveguide and a second portion extending from the first portion to the air bearing surface, with the second portion being structured such that an end of the second portion is closer to the waveguide than the first portion and wherein the second portion is positioned in the first cladding layer and at an angle with respect to the core in the range of about 15° to about 70°.

12. The recording head of claim 11, wherein the second portion comprises an alloy including at least one of Cu, Au or Ag and at least one of Fe, Co or Ni.

13. The recording head of claim 11, wherein the second portion has a uniform cross-sectional shape.

14. The recording head of claim 13, wherein the shape is rectangular.

15. The recording head of claim 13, further comprising:
    a mirror positioned adjacent to the waveguide.

16. The recording head of claim 15, wherein the mirror is position adjacent to a side of the waveguide opposite the write pole.

17. The recording head of claim 11, wherein the thickness of the second portion is smaller than the thickness of the first portion.

18. The recording head of claim 11, further comprising:
    a coil having conductors positioned adjacent to the waveguide and on an opposite side of the waveguide from the write pole.

19. The recording head of claim 11, further comprising:
    a near field transducer.

* * * * *